United States Patent
Urabe (12)

(10) Patent No.: US 6,959,477 B2
(45) Date of Patent: Nov. 1, 2005

(54) METHOD FOR MANUFACTURING ROTARY CUTTING DIE

(76) Inventor: Toshinaga Urabe, 3-20-21, Sounan, Sagamihara-shi, Kanagawa-ken 228-0812 (JP)

( * ) Notice: Subject to any disclaimer, the term of this patent is extended or adjusted under 35 U.S.C. 154(b) by 0 days.

(21) Appl. No.: 10/674,434

(22) Filed: Oct. 1, 2003

(65) Prior Publication Data

US 2004/0065388 A1 Apr. 8, 2004

(30) Foreign Application Priority Data

| Oct. 5, 2002 | (JP) | .............. 2002-327572 |
| Oct. 9, 2002 | (JP) | .............. 2002-331380 |
| Feb. 3, 2003 | (JP) | .............. 2003-064192 |

(51) Int. Cl.[7] .............................................. B23P 17/00
(52) U.S. Cl. .................................................... 29/425
(58) Field of Search .................... 29/425, 418, 423, 29/424, 426.1, 460, 428, 527.1, 527.2, 557; 76/4; 493/340; 83/698.41

(56) References Cited

U.S. PATENT DOCUMENTS

| 6,109,158 | A | * | 8/2000 | Koelsch .................. 83/698.41 |
| 6,189,414 | B1 | * | 2/2001 | Yoshizawa et al. .............. 76/4 |
| D447,495 | S |   | 9/2001 | Strobel et al. |
| 2004/0023773 | A1 | * | 2/2004 | Dombkowski .............. 493/340 |

FOREIGN PATENT DOCUMENTS

JP          3015518          6/1995

* cited by examiner

*Primary Examiner*—John C. Hong
(74) *Attorney, Agent, or Firm*—Wenderoth, Lind & Ponack, L.L.P.

(57) ABSTRACT

A lower plywood sheet and an upper plywood sheet which are set on a cylinder are cut in two processes by use of a router to create a 1.4-mm-wide groove in the back of the lower plywood sheet and in the front of the upper plywood sheet. Thus, a rotary cutting die which allows a 4-point (1.4-mm-thick) blade to be accurately inserted thereinto, a method for manufacturing the same, and a device for manufacturing the same are provided.

3 Claims, 11 Drawing Sheets

METHOD FOR MANUFACTURING ROTARY CUTTING DIE

FIELD OF THE INVENTION

The present invention relates to a rotary cutting die for use with a rotary cutting machine which is employed for manufacturing corrugated cardboards, a device for manufacturing the same, and a method for manufacturing the same.

BACKGROUND

Conventionally, rotary cutting dies have been manufactured by drawing a figure on a curved surface plywood sheet having a thickness of 13 mm (0.5 in.) or 16 mm, and cutting the plywood by use of a manually operated jigsaw. The groove width is generally 4 point (1.42 mm).

Recently, a method which uses a carbon-dioxide laser and a numerical controller for cutting a curved surface plywood has been proposed. For example, Utility Model No. 3015518 has proposed it. A curved blade is inserted into the cut groove to provide a finished rotary cutting die.

Recently, Gerber Scientific Products, Inc. has proposed a method for cutting a flat plate die that uses a router instead of a costly laser cutting machine. The drill bit for use with the router is shown in U.S. Design Pat. No. 447495. FIG. 1 is a sectional view of a flat plate cutting die produced with a router manufactured by Gerber Scientific Products, Inc. To produce such a flat plate cutting die, two plywood sheets 9 mm thick are cut in mirror image. Then, the back surface of the upper plywood sheet 3 and that of the lower plywood sheet 2 are bonded to each other. The drill bit has such a geometrical feature that, if it is for 2-point-wide (0.72-mm-wide) groove cutting, for example, the portion in the range of 2.5 mm from the tip is cylindrical, having a diameter of 0.72 mm. The portion beyond the range of 2.5 mm from the tip is funneled. This is because, if a diameter of 0.72 mm were provided for the drill bit over the entire length of 9 mm from the tip, the strength of the drill bit could not be maintained, resulting in breakage. The flat plate cutting die is made of a 18-mm- or 16-mm-thick plywood, however, if 9- or 8-mm-thick plywood sheets cut with the drill bit are bonded to each other, an 18-mm- or 16-mm-thick plywood sheet can be produced, and a 2.5-mm-deep straight groove for holding a 0.72-mm-thick blade can be created in both front and back surfaces of the bonded plywood. On the other hand, the curved surface plywood for rotary cutting die is generally 13 mm thick (½ in.). The thickness as large as 13 mm cannot be cut with a 4-point drill bit at a time. Thus, the thickness of 13 mm must be divided. But, any curved surface plywood cannot be turned inside out for bonding it to a curved surface plywood which is not turned inside out. Therefore, this turning-inside-out technique cannot be used with a drill bit having a 1.4-mm diameter.

In USA, the rotary cutting die plywood generally has a thickness of 13 mm (½ in.). In Japan, a thickness of 16 mm is also used. The diameter of the rotary cutting machine cylinder is generally 487 mm or 360 mm in USA. In Japan, 10 or more different diameters are used. The thickness of the rotary cutting blade (steel rule knife) used in USA is generally 4 point (1.4 mm). This statement is for the soft anvil method. When a rotary cutting machine cuts by the soft anvil method, the rotating blade is formed as a serrated rule, and cuts into a urethane cylinder which is also rotated for cutting a corrugated cardboard. In Japan, the hard anvil method is also used. The blade is not serrated as is the case with that for the flat plate die. The mating cylinder is made of a steel plate, and the blade will not cut into it. In hard anvil cutting, the rotary cutting die uses a 1.0-mm thick (3 point) blade.

SUMMARY OF THE INVENTION

The purpose of the present invention is to provide a rotary cutting die, a device for manufacturing the same, and a method for manufacturing the same.

Conventionally, if the plywood used for manufacturing a rotary cutting die is 13 mm thick, for example, thirteen veneers having a thickness of 1 mm are laminated, being coated with adhesive on one side, and is placed in a curved surface metallic die for forming a curved surface.

With the present invention, the lower plywood sheet 2 and the upper plywood sheet 3 which are set on the cylinder 1 are cut in two processes by use of the router to create a 1.4-mm-wide groove in the back of the lower plywood sheet 2 and in the front of the upper plywood sheet 3. Thus, a rotary cutting die which allows a 4-point (1.4-mm-thick) blade to be accurately inserted thereinto, a method for manufacturing the same, and a device for manufacturing the same are provided.

The present invention is intended to provide means, a method, and a device which create a lower plywood sheet 2 and an upper plywood sheet 3 on the cylinder 1 from veneers 31, and cut a 4-point groove in these plywoods on the cylinder 1 by use of a numerically controlled router 4.

DESCRIPTION OF THE PREFERRED EMBODIMENTS

Figure 1:
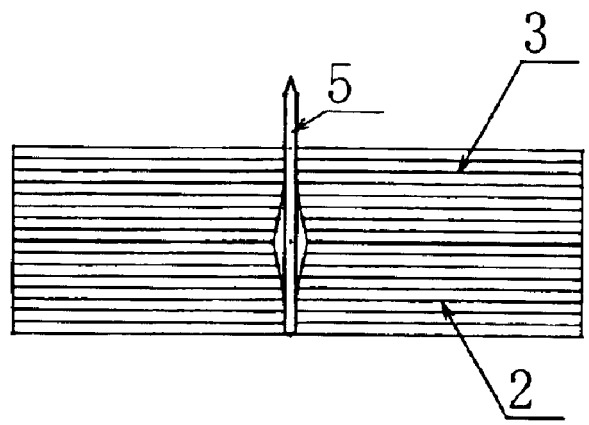
FIG. 1 is a sectional view of a flat plate cutting die produced with a router manufactured by Gerber Scientific Products, Inc.

Hereinbelow embodiments of the present invention will be explained in detail with reference to the accompanying drawings.

Embodiment 1:

A device according to the present invention comprises a cylinder 1 which is turned around the Y axis; a router 4 which travels along the X axis perpendicular to the cylinder 1; a silicone rubber sheet 6 for covering veneers 31 which are disposed on the circumference of the cylinder 1, being coated with adhesive; and a vacuum pump 16 for evacuating the air between the cylinder 1 and the silicone rubber sheet 6. At both ends of the cylinder 1, a shaft 11 is provided to make it possible to turn the cylinder 1, and the shaft 11 is supported by pillow blocks 12. The pillow blocks 12 are fixed to a frame 13, The shaft 11 is turned by a Y-axis turning servomotor 15 through a transmission gear box 14. The Y-axis turning servomotor 15 is connected to a numerical controller. The inside of the cylinder 1 provides a hollow air chamber. This chamber is connected to the vacuum pump 16 through a pipe 17. In the surface of the cylinder 1, a number of air holes 18 are provided which penetrate to the air chamber. The vacuum pump 16 evacuates the air in the chamber. Above the cylinder 1, the silicone rubber sheet 6 is fixed. If the surface of the cylinder 1 is laminated with a plastic material, it can withstand the cutting force of a router end mill.

On the frame 13, a rack rail 42 allows the router 4 to travel in parallel with the cylinder 1. The router 4 travels on the rack rail 42 by an X-axis servomotor 43. The X-axis servomotor 43 is connected to the numerical controller. The router 4 travels on a ball screw 45 by a Z-axis servomotor 44 for controlling the depth of cut of the veneers. The Z-axis servomotor 44 is connected to the numerical controller.

Embodiment 2:

Hereinbelow a method of manufacturing a rotary cutting die with the device in the embodiment 1 will be explained.

Nine veneers 31 each having a thickness of approximately 1 mm and which are coated with adhesive on one side are placed on the cylinder 1; the nine veneers 31 are covered with the silicone rubber sheet 6, and by means of the vacuum pump 16, the air between the cylinder 1 and the silicone rubber sheet 6 is evacuated through the air holes 18 in the cylinder 1 to force the veneers 31 to be wrapped around the outside surface of cylinder 1. Before evacuating the air, the veneers 31 are in the state of a flat sheet, and are not wrapped around the outside surface of the cylinder 1, but evacuating the air causes the veneers 31 to tightly contact the cylinder 1. Leaving them for 10 minutes or so will solidify the adhesive, and a 9-mm lower plywood sheet 2 is completed. If necessary, a heater is incorporated in the cylinder 1 for heating the veneers 31 to speed up the bonding.

After the veneers 31 are solidified, the silicone rubber 6 is removed, and the router 4 is used to cut a 4-point wide groove in the lower plywood sheet 2 for allowing a steel rule 5 to be inserted thereinto. The dimensional data for cutting along the Y axis must provide a "shrinkage allowance".

After completion of the cutting, an additional four veneers 31 which are coated with adhesive are placed on the lower plywood sheet 2. The four veneers 31 and the lower plywood sheet 2 are covered with the silicone rubber sheet 6. By means of the vacuum pump 16, the air between the cylinder 1 and the silicone rubber sheet 6 is evacuated to force the additional veneers 31 to be wrapped around the outside surface of the lower plywood sheet 2, and the adhesive is solidified.

After the solidification, the silicone rubber sheet 6 is removed, and the router 4 is used to cut a 4-point wide groove in an upper plywood sheet 3 for allowing the steel rule 5 to be inserted thereinto.

Figure 2:
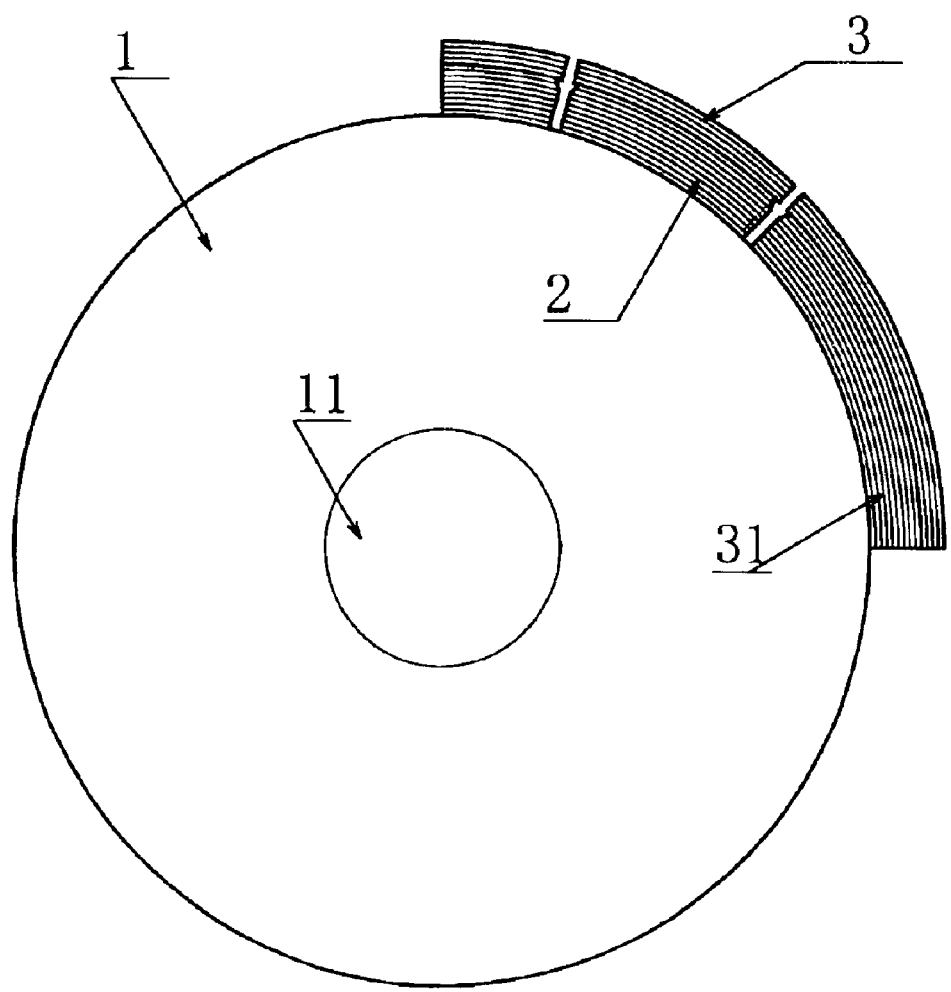
FIG. 2 is a sectional view of a rotary cutting die plywood according to an embodiment of the present invention.
Figure 3:
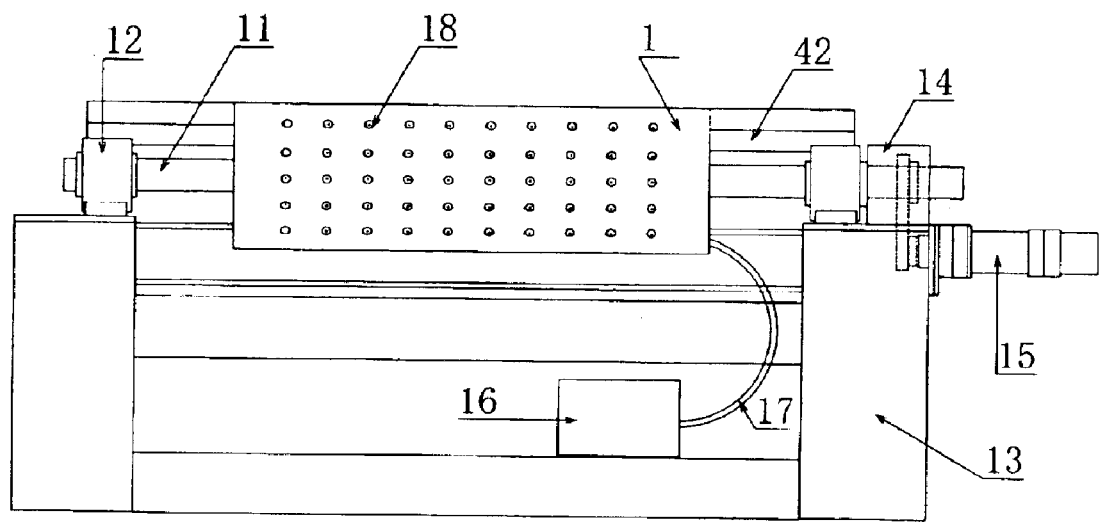
FIG. 3 is a front view of a device according to the present invention.
Figure 4:
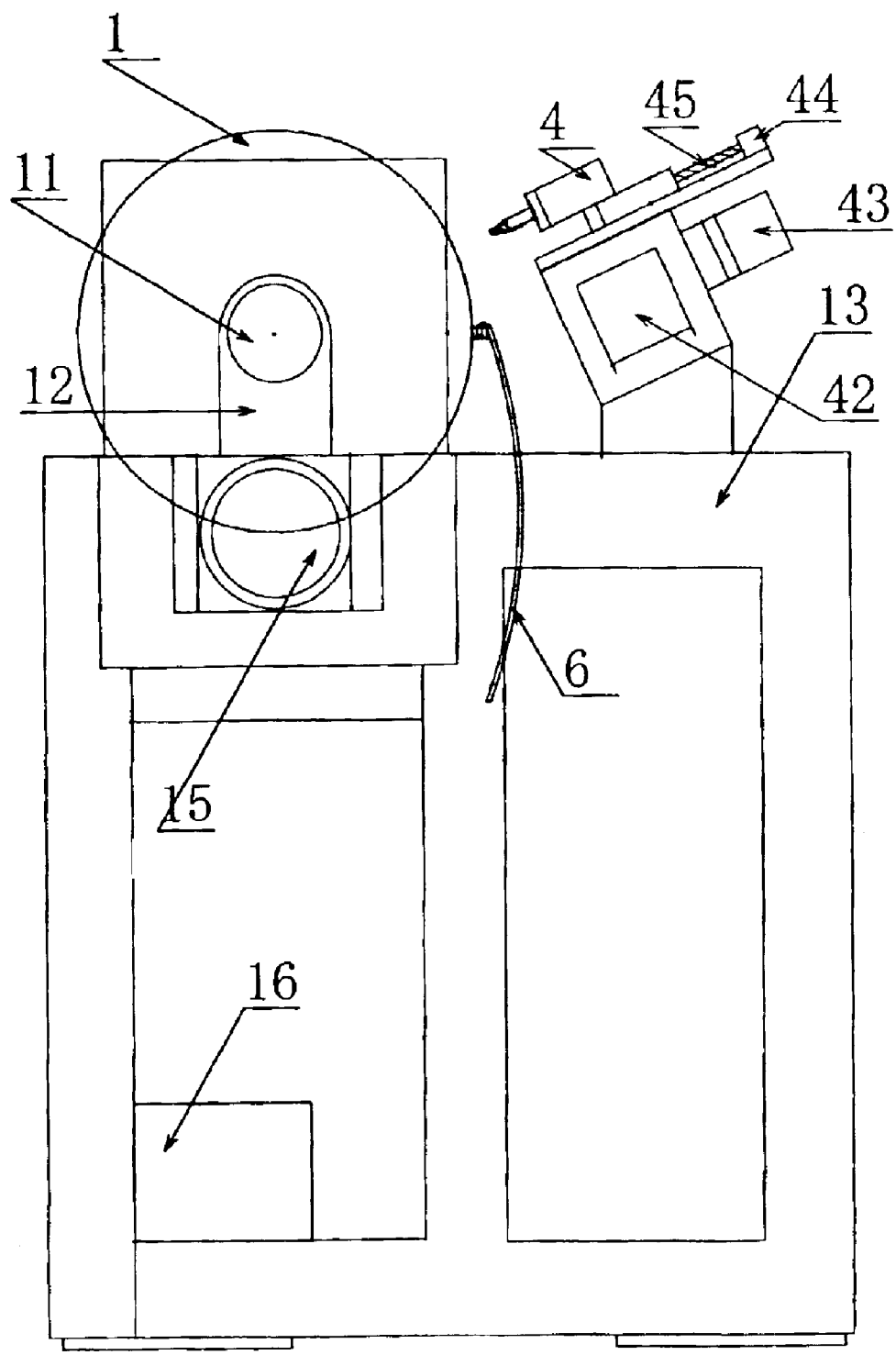
FIG. 4 is a side view of a device according to the present invention.

The end mill to be used with this router is provided with a 4-point (1.4-mm-dia) tip portion having a length of 5 mm, funneled in the portion continued from the tip portion for reinforcement, like the Gerber Scientific Products, Inc. end mill as disclosed in U.S. Design Pat. No. 447495. Therefore, the groove produced in the lower plywood sheet 2 is 4-point wide in the portion up to 5 mm from the bottom, and is funneled in the portion beyond 5 mm as shown in FIG. 2. If the funneled portion is required to be 4-point wide, it can be realized by increasing the number of lamination times to three. However, even if the groove in the surface of the lower plywood 2 is funneled, practically no problem is caused.

The thickness of the plywood sheet, the thickness of each of the veneers 31 used, and the number of veneers 31 used are not limited to those in the present embodiment. They may be adjusted as needed.

Embodiment 3:

In the embodiment 2, adhesive solidification is performed in two separate processes, but in the present embodiment, adhesive solidification is performed in only one process. In the present embodiment, nine veneers 31 each having a thickness of approximately 1 mm that are coated with adhesive on the top side thereof are placed on the cylinder 1 (a ninth veneer 31 not being coated with adhesive). On the nine veneers 31, four veneers 31 each having a thickness of approximately 1 mm which are coated with adhesive on the top side thereof are placed (a fourth veneer 31 not being coated with adhesive). The four veneers 31 and the nine veneers 31 are covered with the silicone rubber sheet 6. By means of the vacuum pump 16, the air between the cylinder 1 and the silicone rubber sheet 6 is evacuated to force the veneers 31 to be wrapped around the outside surface of the cylinder 1, and the adhesive is solidified.

After the solidification, the silicone rubber sheet 6 is removed, an upper plywood sheet 3, with which four veneers 31 are laminated, is temporarily removed from the cylinder 1, and the router 4 is used to cut a 4-point wide groove in a lower plywood sheet 2, with which nine veneers 31 are laminated, for allowing a steel rule 5 to be inserted thereinto.

The upper plywood sheet 3, with which four veneers 31 are laminated, and which has been temporarily removed from the cylinder 1, is replaced onto the lower plywood sheet 2, and the router 4 is used to cut a 4-point wide groove in the upper plywood sheet 3 for allowing the steel rule 5 to be inserted thereinto. Bonding the lower plywood sheet 2 to the upper plywood sheet 3 may be performed before cutting the upper plywood sheet 3 or outside the machine rather than on the cylinder 1 after cutting the upper plywood sheet 3.

Figure 5:
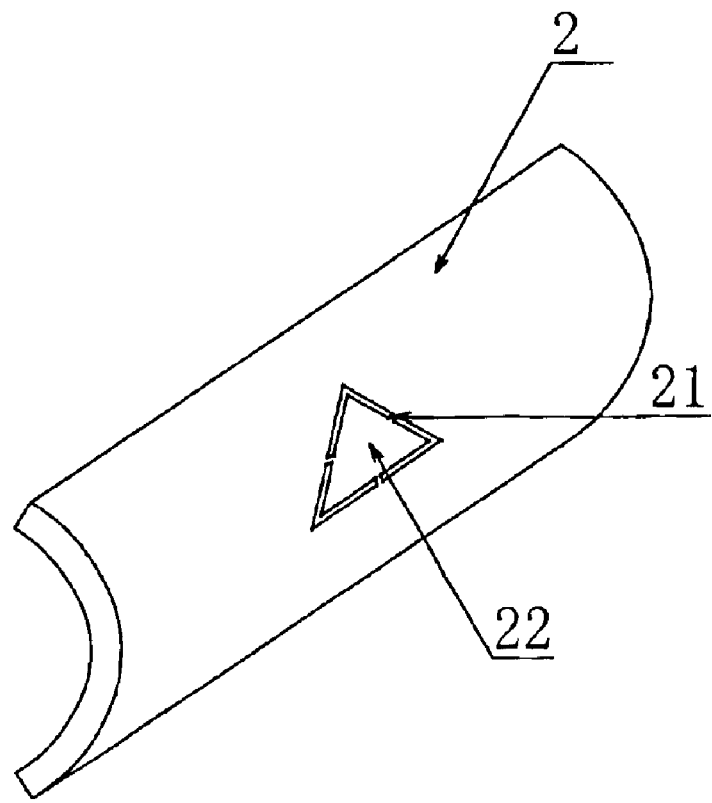
FIG. 5 is a perspective side view of a lower plywood according to the present invention.
Figure 6:
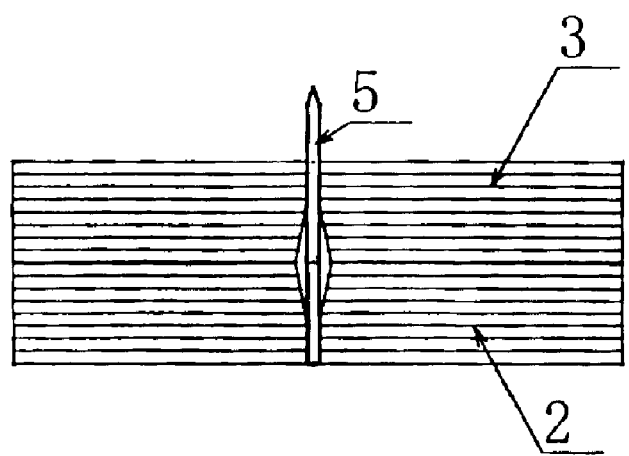
FIG. 6 is a sectional view of a flat plate cutting die produced with a router manufactured by Gerber Scientific Products, Inc.

In manufacturing of a rotary cutting die, bending the blade needs skill. This is because the blade for a rotary cutting die is comb-like, and such a comb-like blade must be bent in the three-dimensional space. Especially, when the blades forming two hypotenuses of a triangle that are not in parallel with the X and Y axes as shown in FIG. 5 are to be bent, skill is required. Also, especially when the hard anvil method is used, the blade must be accurately bent such that the bottom of the blade is positively contacted with the outside surface of the cylinder of the cutting machine. In order to assure that the bottom of the blade which has been bent and inserted is positively contacted with the outside surface of the cylinder, the inside of the plywood must be examined by removing the screws from the cylinder every time the blade is inserted. Then, with the present invention, internal panels 22 are provided in the lower plywood sheet 2, and the length of a bridge 21 for each internal panel 22 is minimized such that the internal panel 22 can be unloaded when required. By unloading the internal panel 22 for examining the bent blade on the cylinder with the use of the internal panel 22 as a gage, whether or not the bottom of the blade is accurately contacted with the cylinder can be examined. Because the bending result can be examined with the aid of the internal panel 22, there is no need for skill. If it is found that the blade is not bent such that the bottom thereof positively contacts the cylinder, the blade is bent again such that the bottom thereof positively contacts the cylinder. After bending the blade such that the bottom thereof reliably contacts the cylinder, the lower plywood sheet 2 is bonded to the upper plywood sheet 3 which has been previously cut. Now, the accurately bent blade can be inserted with the bottom thereof positively contacting the cylinder.

Embodiment 5:

A device according to the present invention comprises a cylinder 1 which can be turned around the Y axis; a router 4 which can travel along the X axis perpendicular to the cylinder 1; a thick cloth 61 for covering veneers 31 which are disposed on the circumference of the cylinder 1, and coated with adhesive; and winding-up rollers 63 for causing the veneers 31 to be wrapped around the cylinder 1. At both ends of the thick cloth 61, a hook 62 is provided, and the hook 62 is engaged with the hook 62 on the winding-up roller 63. Then by turning the winding-up rollers 63, the thick cloth 61 causes the thirteen veneers 31 coated with adhesive to be wrapped around the circumference of the cylinder 1 and tightly contacting the cylinder.

At both ends of the cylinder 1, a shaft 11 is provided to make it possible to turn the cylinder 1, and the shaft 11 is supported by pillow blocks 12. The pillow blocks 12 are fixed to a frame 13. The shaft 11 is turned by a Y-axis turning servomotor 15 through a transmission gear box 14. The Y-axis turning servomotor 15 is connected to a numerical controller. If the outside surface of the cylinder 1 is laminated with a plastic material, it can withstand the cutting force of a router end mill.

On the frame 13, a rack rail 42 allows the router 4 to travel parallel to the cylinder 1. The router 4 travels on the rack rail 42 by an X-axis servomotor 43. The X-axis servomotor 43 is connected to the numerical controller. The router 4 travels on a ball screw 45 by a Z-axis servomotor 44 for controlling the depth of cut of the veneers. The Z-axis servomotor 44 is connected to the numerical controller.

In the present embodiment, the rollers 63 for winding up the thick cloth 61 are used to force the veneers 31 to be wrapped around the circumference of the cylinder 1. However, because it is only required that the thick cloth 61 be wrapped around the circumference of the cylinder 1, an air cylinder or the like may be used instead of the rollers 63, a rotating device. The thick cloth 61 is optimum for drying the adhesive, because the solvent is vented through between fibers. However, a flat plate made of such a material as stainless steel may be used. Because it is only required that the veneers 31 be wrapped around the cylinder 1, a plurality of wide belts may be used. To speed up the drying of the adhesive, a heater may be embedded in the outside surface of the cylinder 1 for heating the adhesive. Also, surface heaters may be applied to the inside or outside surface of the thick cloth 61.

Embodiment 6:

Hereinbelow a method of manufacturing a rotary cutting die with the device in the embodiment 5 will be explained.

Nine veneers 31 each having a thickness of approximately 1 mm which are coated with adhesive on one side are placed on the cylinder 1. The nine veneers 31 are covered with the thick cloth 61, the hook 62 at both ends of the thick cloth 61 is engaged with the hook 62 on the roller 63, and the rollers 63 are turned. The inside diameter of the thick cloth 61 is gradually decreased to hold down the veneers 31 onto the circumference of the cylinder 1 and finally completely wrap the veneers 31 around the outside surface of the cylinder 1 such that the veneers 31 are in tight contact with the cylinder 1. After the veneers 31 are tightly contacting the cylinder 1, the locking mechanism (not shown) is actuated to leave the veneers 31 as contacted for 10 minutes or so. The adhesive will be solidified, and the 9-mm lower plywood sheet 2 is completed. If necessary, a heater is incorporated in the cylinder 1 for heating the veneers 31 to speed up the bonding.

After the veneers 31 are solidified, the thick cloth 61 is removed, and the router 4 is used to cut a 4-point wide groove in the lower plywood sheet 2 for allowing a steel rule 5 to be inserted thereinto. The dimensional data for cutting along the Y axis must provide a "shrinkage allowance".

After completion of the cutting, an additional four veneers 31 which are coated with adhesive are placed on the lower plywood sheet 2. The four veneers 31 and the lower plywood sheet 2 are covered with the thick cloth 61, the hook 62 at both ends of the thick cloth 61 is engaged with the hook 62 on the roller 63, and the rollers 63 are turned. The inside diameter of the thick cloth 61 is gradually decreased to hold down the veneers 31 onto the circumference of the cylinder 1 and finally completely wrap the veneers 31 around the outside surface of the cylinder 1 such that the veneers 31 are in tight contact with the cylinder 1. The adhesive is solidified while the additional veneers 31 are wrapped around the outside surface of the lower plywood sheet 2.

After the solidification, the thick cloth 61 is removed, and the router 4 is used to cut a 4-point wide groove in an upper plywood sheet 3 for allowing the steel rule 5 to be inserted thereinto.

Figure 7:
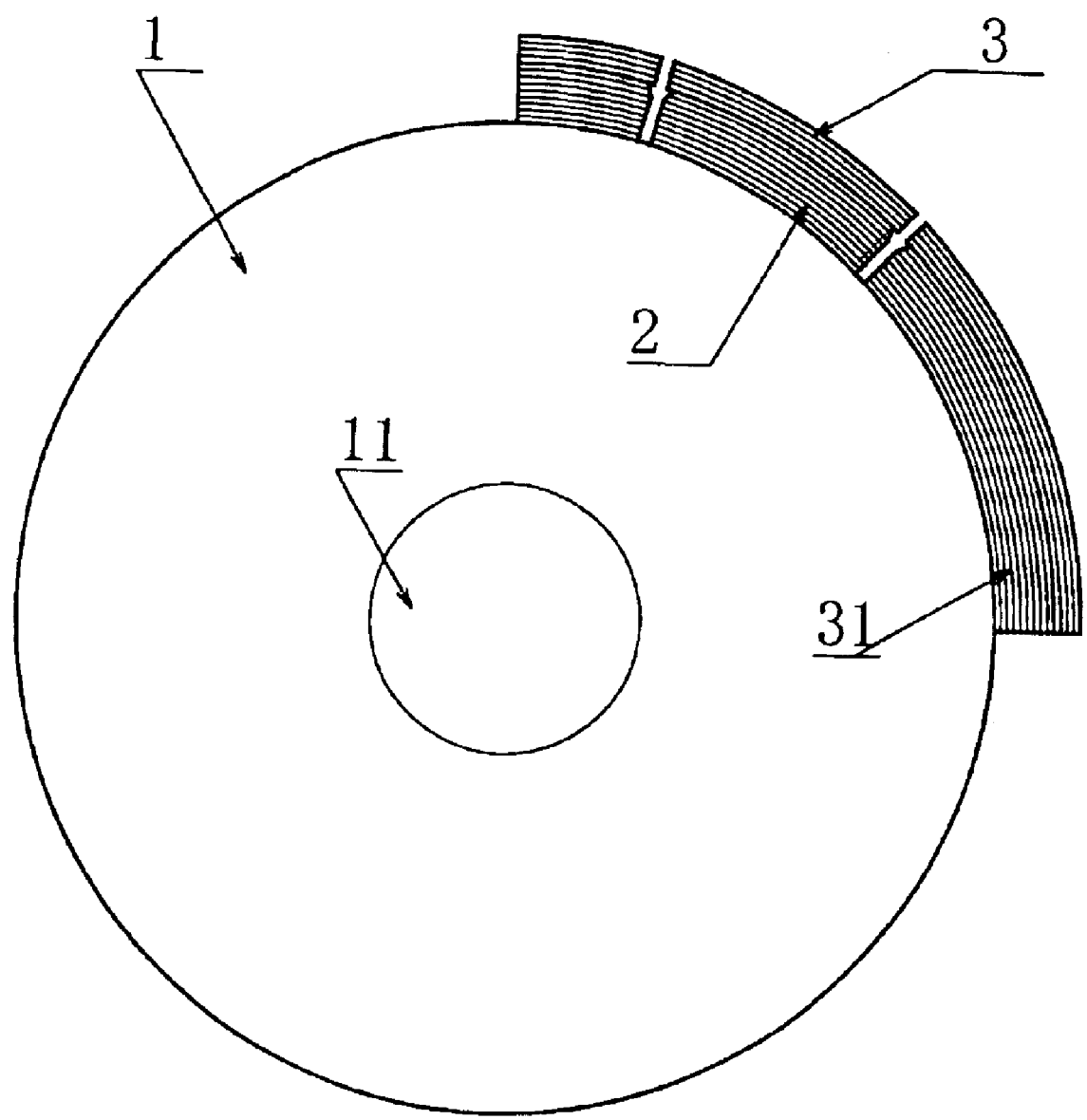
FIG. 7 is a sectional view of a rotary cutting die plywood according to an embodiment of the present invention.
Figure 8:
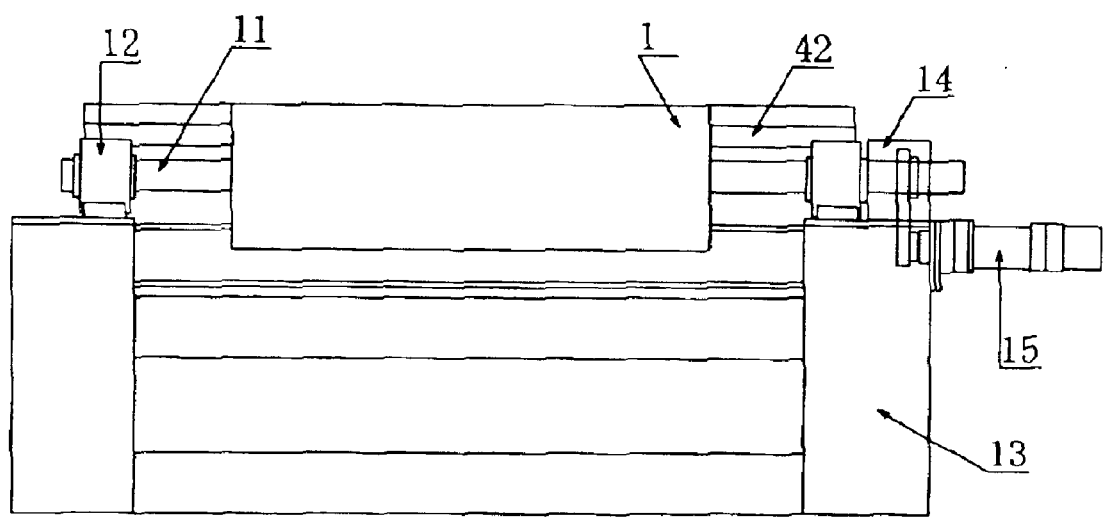
FIG. 8 is a front view of a device according to the present invention.
Figure 9:
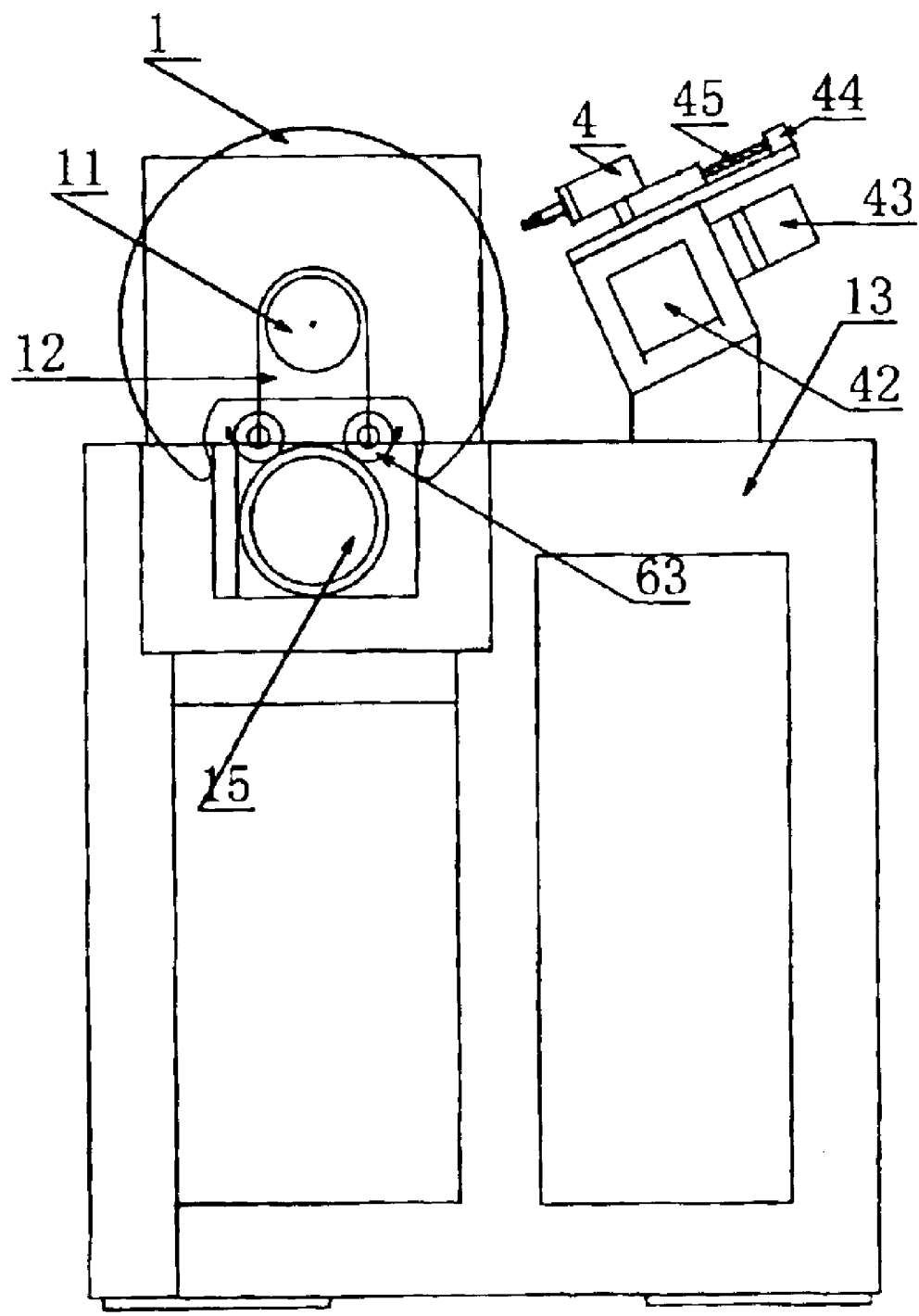
FIG. 9 is a side view of a device according to the present invention.

The end mill to be used with this router is provided with a 4-point (1.4-mm-dia) tip portion having a length of 5 mm, and is funneled in the portion continued from the tip portion for reinforcement, like the Gerber Scientific Products, Inc. end mill as disclosed in U.S. Design Pat. No. 447,495. Therefore, the groove produced in the lower plywood sheet 2 is 4-point wide in the portion up to 5 mm from the bottom, and is funneled in the portion beyond 5 mm from the bottom as shown in FIG. 7. If the funneled portion is required to be 4-point wide, it can be realized by increasing the number of lamination times to three. However, even if the groove in the surface of the lower plywood sheet 2 is funneled, practically no problem is caused.

The thickness of the plywood sheet, the thickness of each of the veneers 31 used, and the number of veneers 31 used are not limited to those in the present embodiment. They may be adjusted as needed.

Figure 10:
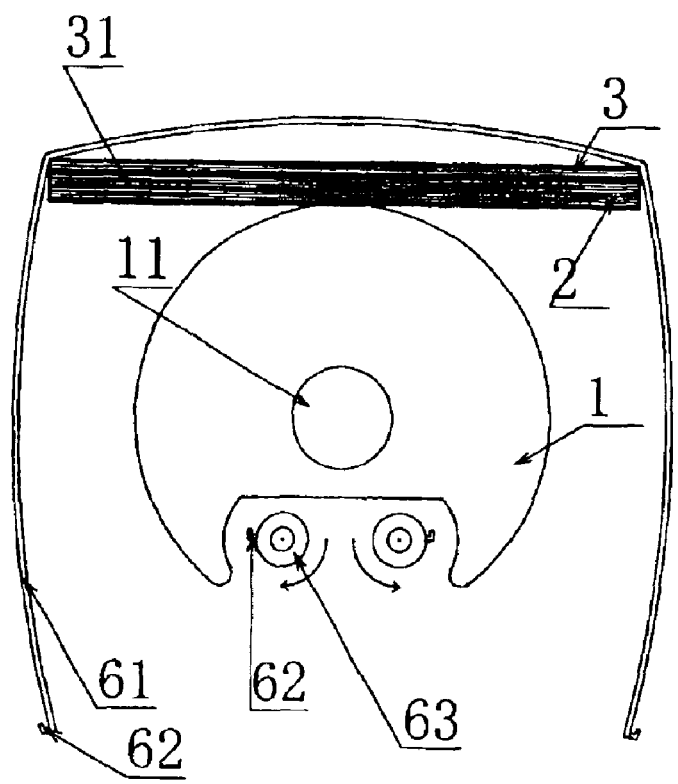
FIG. 10 is a sectional view showing the relationship between the cylinder 1 and the thick cloth 61 according to the present invention.
Figure 11:
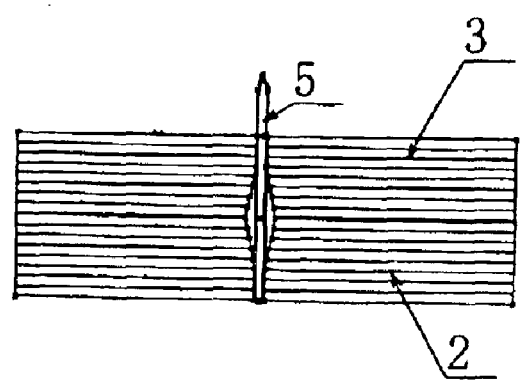
FIG. 11 is a sectional view of a flat plate cutting die produced with a router manufactured by Gerber Scientific Products, Inc.

Embodiment 7:

FIG. 10 shows the positional relationship between the thick cloth 61 and the veneers 31 coated with adhesive that are placed on the cylinder 1 according to the present invention.

In the embodiment 6, adhesive solidification is performed in two separate processes, but in the present embodiment, adhesive solidification is performed in only one process. In the present embodiment, nine veneers 31 each having a thickness of approximately 1 mm that are coated with adhesive on the top side thereof are placed on the cylinder 1 (a ninth veneer 31 not being coated with adhesive). On the nine veneers 31, four veneers 31 each having a thickness of approximately 1 mm that are coated with adhesive on the top side thereof are placed (a fourth veneer 31 not being coated with adhesive). The four veneers 31 and the nine veneers 31 are covered with the thick cloth 61, the hook 62 at both ends of the thick cloth 61 is engaged with the hook 62 on the roller 63, and the rollers 63 are turned. The inside diameter of the thick cloth 61 is gradually decreased to hold down the veneers 31 onto the circumference of the cylinder 1 and finally completely wrap the veneers 31 around the outside surface of the cylinder 1 such that the veneers 31 are in tight contact with the cylinder 1.

After the solidification, the thick cloth 61 is removed, an upper plywood sheet 3, with which four veneers 31 are laminated, is temporarily removed from the cylinder 1, and the router 4 is used to cut a 4-point wide groove in a lower plywood sheet 2, with which nine veneers 31 are laminated, for allowing a steel rule 5 to be inserted thereinto.

The upper plywood sheet 3, with which four veneers 31 are laminated, and which has been temporarily removed from the cylinder 1, is replaced onto the lower plywood sheet 2, and the router 4 is used to cut a 4-point wide groove in the upper plywood sheet 3 for allowing the steel rule 5 to be inserted thereinto. Bonding the lower plywood sheet 2 to the upper plywood sheet 3 may be performed before cutting the upper plywood sheet 3 or outside the machine rather than on the cylinder 1 after cutting the upper plywood sheet 3.

Embodiment 8:

In the embodiment 7, after the upper plywood sheet 3 and the lower plywood sheet 2 are manufactured, the upper plywood sheet 3 is temporarily removed, or, alternatively, with the upper plywood sheet 3 being kept as it is, the router 4 is used to cut a 4-point wide groove in the upper plywood sheet 3 for allowing the steel rule 5 to be inserted thereinto. After cutting the upper plywood sheet 3, it may be temporarily removed, and then a 4-point wide groove for allowing the steel rule 5 to be inserted into the lower plywood sheet 2 may be cut in the lower plywood sheet 2. Then, the upper plywood sheet 3 may be bonded to the lower plywood sheet 2 on the cylinder, or outside the machine, for example, on the blade bending cylinder.

Embodiment 9:

A device according to the present invention comprises a cylinder 1 which is turned around the Y axis; a router 4 which travels along the X axis perpendicular to the cylinder 1; a thick cloth 61 for covering veneers 31 which are disposed on the circumference of the cylinder 1, and coated with adhesive; and a winding-up roller 63 on the opposite side of the cylinder 1 for causing the veneers 31 to be wrapped around the cylinder 1. The roller 63 is fixed on the opposite side of the cylinder 1. At both ends of the thick cloth 61, a hook 62 is provided, and the hook 62 is engaged with the hook 62 on the winding-up roller 63. Then by turning the winding-up roller 63, the thick cloth 61 causes the thirteen veneers 31 coated with adhesive to be wrapped around the circumference of the cylinder 1 and tightly contact the cylinder.

At both ends of the cylinder 1, a shaft 11 is provided to make it possible to turn the cylinder 1, and the shaft 11 is supported by pillow blocks 12. The pillow blocks 12 are fixed to a frame 13, The shaft 11 is turned by a Y-axis turning servomotor 15 through a transmission gear box 14. The Y-axis turning servomotor 15 is connected to a numerical controller. If the outside surface of the cylinder 1 is laminated with a plastic material, it can withstand the cutting force of a router end mill. A veneer may be used instead of the plastic material.

On the frame 13, a rack rail 42 allows the router 4 to travel in parallel with the cylinder 1. The router 4 travels on the rack rail 42 due to an X-axis servomotor 43. The X-axis servomotor 43 is connected to the numerical controller. The router 4 travels on a ball screw 45 due to a Z-axis servomotor 44 for controlling the depth of cut of the veneers. The Z-axis servomotor 44 is connected to the numerical controller.

In the present embodiment, the roller 63 for winding up the thick cloth 61 is used to force the veneers 31 to be wrapped around the circumference of the cylinder 1. However, because it is only required that the thick cloth 61 be wrapped around the circumference of the cylinder 1, an air cylinder or the like may be used instead of the roller 63, a rotating device. The thick cloth 61 is optimum for drying the adhesive, because the solvent is vented through between the fibers, but a flat plate made of such a material as stainless steel may be used. An elastic material such as a rubber sheet is optimum for bringing the veneers 31 in tight contact with the cylinder 1. Because it is only required that the veneers 31 be wrapped around the cylinder 1, a plurality of wide belts may be used. To speed up the drying of the adhesive, a heater may be embedded in the outside surface of the cylinder 1 for heating the adhesive. Also, surface heaters may be applied to the inside or outside surface of the thick cloth 61.

Figure 14:
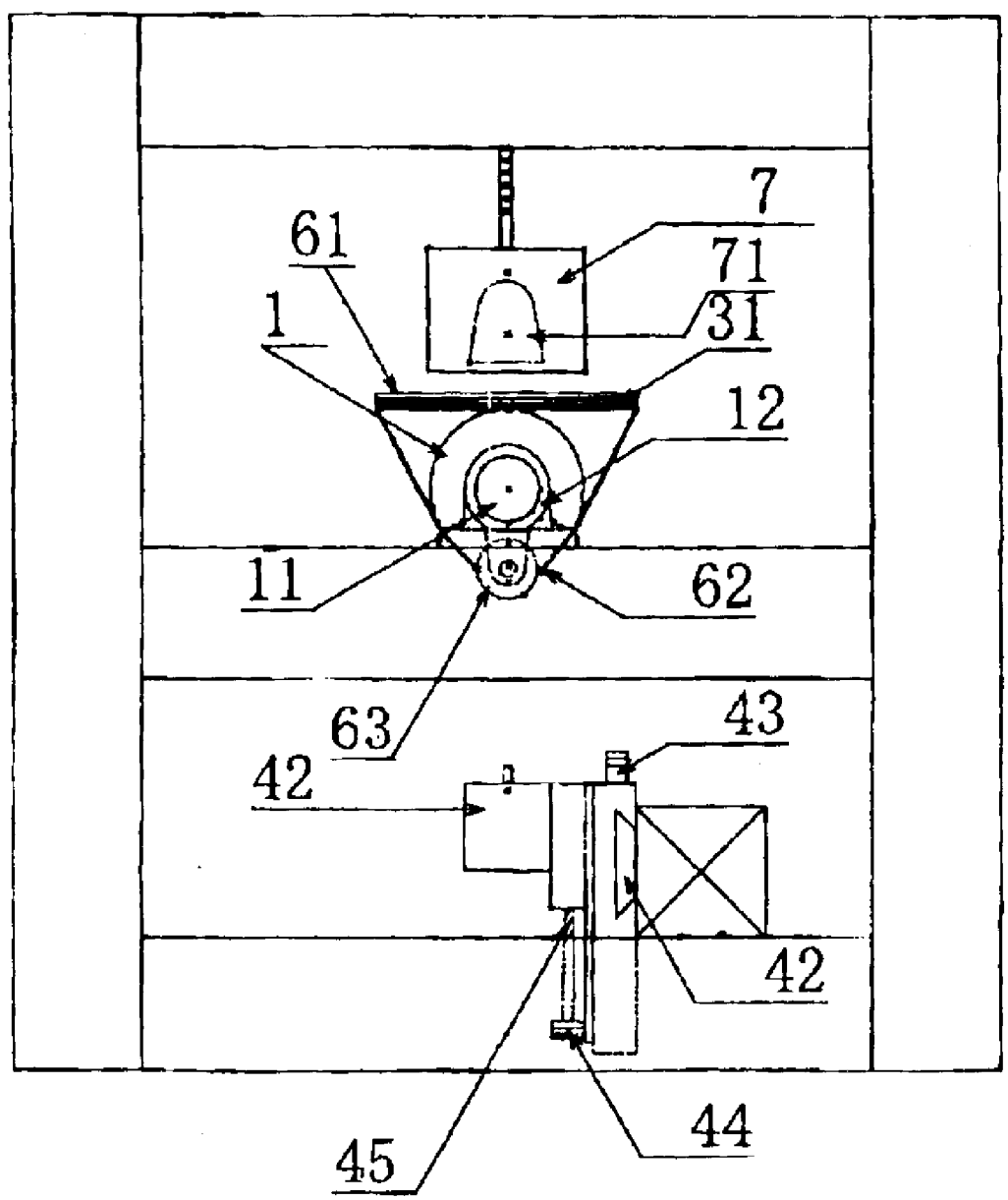
FIG. 14 is a side view of a device according to the present invention.

As shown in FIG. 14, nine veneers 31 each having a thickness of approximately 1 mm which are coated with adhesive on one side are placed on the cylinder 1. The nine veneers 31 are covered with the thick cloth 61, the hook 62 at both ends of the thick cloth 61 is engaged with the hook 62 on the roller 63, and the roller 63 is turned. The inside diameter of the thick cloth 61 is gradually decreased to hold down the veneers 31 onto the circumference of the cylinder 1 and finally completely wrap the veneers 31 around the outside surface of the cylinder 1 such that the veneers 31 are in tight contact with the cylinder 1. After the veneers 31 tightly contact the cylinder 1, the locking mechanism (not shown) is actuated to leave the veneers 31 as contacted for 10 minutes or so. The adhesive will be solidified, and the 9-mm lower plywood 2 is completed. If necessary, a heater is incorporated in the cylinder 1 for heating the veneers 31 to speed up the bonding. Alternatively, the veneers 31 may be heated from outside of the thick cloth 61.

In the present embodiment, a high-frequency heating device 7 for increasing the bonding speed is provided above the thick cloth 61. Inside of the heating device, a magnetron 71 is mounted in parallel with the cylinder 1, and the high-frequency heating device 7 is suspended from the frame 13, After the thick cloth 61 is wound up by means of the winding-up roller 63 until the veneers 31 are wrapped around the cylinder 1 to be completely in tight contact therewith, the high-frequency heating device 7 is lowered to a position close to the thick cloth 61. The magnetron 71 is oscillated, and at the same time the cylinder 1 is turned around the Y axis until restricted, and then the cylinder 1 is turned in a reverse direction. The purpose of this is to allow the magnetron 71 to heat the adhesive in the veneers 31 as uniformly as possible. Because, with this machine, the X, Y, and Z axes are controlled by the respective servomotors for cutting the plywood, the speed can be finely adjusted. Therefore, the Y axis can be turned at a speed which is optimum for heating. There is no need for controlling the output of the magnetron 71. There is no need for installing as many magnetrons 71 as required for irradiating the entire surface of the plywood at a time, but only a single row of magnetrons 71 may be installed in parallel with the cylinder 1, which substantially reduces the equipment cost. The high-frequency wave generated by the high-frequency heating device 7 is applied only to the moisture contained in the adhesive and the inside of the veneers 31, and is not applied to any machine members, which is extremely good for their durability. If the moisture in the veneers 31 is heated, the veneers 31 will be softened so as to be easy to be bent. High-frequency heating is especially suited for softening the veneers 31 which have a wood grain perpendicular to the cylinder 1. The high-frequency wave penetrates through the thick cloth 61 for causing the veneers 31 to be wrapped around the cylinder 1, and thus no heat loss is produced. Because the cylinder 1 is made of metal, the high-frequency wave is reflected toward the veneers 31, the thermal efficiency is bettered. In FIG. 14, the cylinder 1 shown has a minimum diameter, while, in FIG. 15, the cylinder 1 as shown in FIG. 14 is jacketed with a wooden cylinder 10 having a large diameter. The inside of the cylinder 10 is hollow except that reinforcement plates are provided. Preferably, the surface of the wooden cylinder 10 having a large diameter is coated with an aluminum plate, which causes the high-frequency wave to be reflected, resulting in an improved thermal efficiency. By exchanging wooden dies as needed, the diameter can be freely changed. If the surface of the wooden cylinder 10 is cut by means of the router 4 in this device, a high circularity can be obtained. Consequently, a plywood sheet for rotary cutting die that has an accurate inside diameter, which is the most important factor for any particular rotary cutting die, can be produced.

Figure 13:
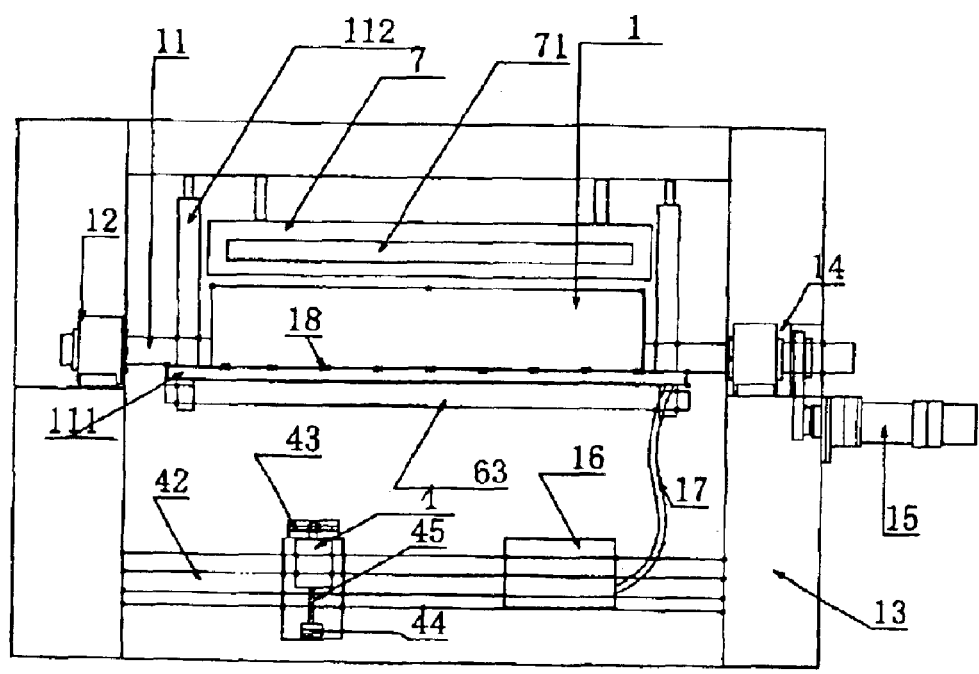
FIG. 13 is a front view of a device according to the present invention.
Figure 15:
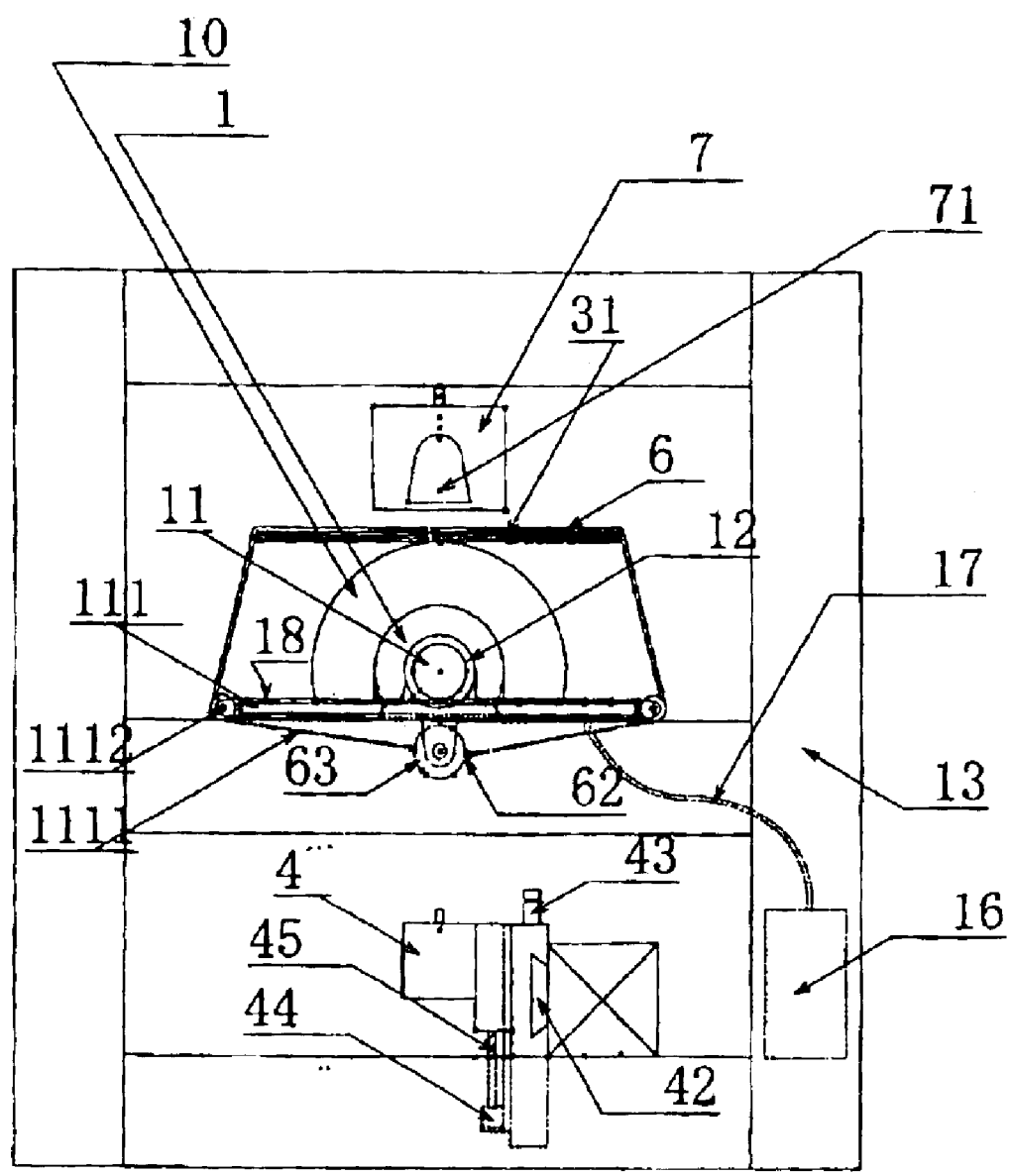
FIG. 15 is a side view of a device according to the present invention.

Embodiment 10:

FIG. 15 shows another embodiment. FIG. 15 is a left side view of FIG. 13. In FIG. 13, a left frame 13, which is given in FIG. 15, cannot be seen, and rollers 1112 are omitted. Instead of the thick cloth 61, a silicone rubber sheet 6 is used; and a suction chamber 111 is disposed under the cylinder 1 and the shaft 11. In the top surface of the suction chamber 111, air holes 18 for sucking the silicone rubber sheet 6 are cut. The suction chamber 111 is hollow, and is connected to a vacuum pump 16 through a pipe 17. At both ends of the suction chamber 111, the rollers 1112 are disposed, and the silicone rubber sheet 6 is connected to a wire 1111 which winds up the silicone rubber sheet 6 for allowing it to be sucked by the air holes 18. The wire 1111 is engaged with a hook 62 on the winding-up roller 63 to be wound up and the vacuum pump 16 sucks the air. Then, the veneers 31 provided with adhesive are warped, and the silicone rubber sheet 6 is stretched to tightly contact the cylinder 1. The end portions of the silicone rubber sheet 6 tightly contact the air holes 18 in the suction chamber 111. At both ends of the cylinder 1, the holding-down dies 112 prevent the air from flowing in. In FIG. 15, the cylinder 1, unlike that as shown in FIG. 14, is jacketed with a wooden cylinder 10 having a large diameter, thus with the device as shown in FIG. 15, a rotary cutting die plywood with a desired diameter can be obtained. Of course, also with the device as shown in FIG. 14, the cylinder 1 can be jacketed with a large diameter cylinder 10. With the silicone rubber sheet 6 being brought into tight contact with the large diameter cylinder 10, the high-frequency heating device 7 is lowered to a position close to the silicone rubber sheet 6. The magnetron 71 is oscillated, and at the same time the cylinder 1 is turned around the Y axis until restricted, and then the cylinder 1 is turned in a reverse direction. The veneers 31 are heated in the same way as in the embodiment 1. The silicone rubber sheet 6 has a heat resistance of approximately 250° C. The high-frequency wave from the high-frequency heating device 7 penetrates through the silicone rubber sheet 6 without heating it, and directly heats the moisture and the adhesive in the veneers 31. The adhesive will be solidified in approximately 5 to 10 minutes, and if suctioning by the vacuum pump 16 is stopped, and the silicone rubber sheet 6 is removed, the plywood sheets tightly contacting the large diameter cylinder 10 can maintain the geometry.

Embodiment 11:

To manufacture a rotary cutting die from the plywood which is finished with the device in the embodiment, the thick cloth 61 or silicone rubber sheet 6 is removed after the veneers 32 are solidified, the plywood sheet is turned by a half turn, and cut from the lower section of the machine by means of the router 4 which is installed, being directed upward. Specifically, the following three different methods can be used for manufacturing the rotary cutting die.

The method (A) comprises manufacturing the lower plywood sheet 2 first; then, cutting it by means of the router 4; manufacturing the upper plywood sheet 3 on the lower plywood sheet 2; and then cutting it with the router 4.

The method (B) comprises separately manufacturing and storing the lower plywood sheet 2 and the upper plywood sheet 3; cutting each of them after the order is received; and then bonding them to each other. This method is useful when the job is small. Before storing, the circumference may be cut (finished to the same dimension as that of the commercially available rotary cutting die plywood, which is generally semi-circular), a part of the bolt holes for mounting the cutting die onto the machine being cut.

The method (C) manufactures the lower plywood 2 and the upper plywood 3 at the same time. Thirteen veneers 31 approximately 1 mm thick, for example, are coated with adhesive between veneers 31 except between a fourth and a fifth from the top. After the adhesive is solidified, the upper four veneers 31 form the upper plywood sheet 3, while the lower nine form the lower plywood sheet 2. After the solidification, the upper plywood sheet 3 is cut, and then removed from the cylinder 1, which is followed by cutting the lower plywood sheet 2. Also, with this method, the lower plywood sheet 2 and the upper plywood sheet 3 may be stored after the circumference is cut (finished to the same dimension as that of the commercially available rotary cutting die plywood, which is generally semi-circular), a part of the bolt holes for mounting the cutting die onto the machine being cut.

Details of method (A)

Nine veneers 31 coated with adhesive are placed on the cylinder 1, the nine veneers 31 are covered with the thick cloth 61 or silicone rubber sheet 6, the hook 62 at both ends of the thick cloth 61 or silicone rubber sheet 6 is engaged with the hook 62 on the roller 63, and the roller(s) 63 is (are) turned. The inside diameter of the thick cloth 61 or silicone rubber sheet 6 is gradually decreased to hold down the veneers 31 onto the circumference of the cylinder 1 and finally completely wrap the veneers 31 around the outside surface of the cylinder 1 such that the veneers 31 are in tight contact with the cylinder 1. After the adhesive is fully solidified by heating or the like, a lower plywood sheet 2 will be provided, and then the cylinder 1 is turned by a half turn, and a 4-point wide groove for allowing the steel rule 5 to be inserted into the lower plywood sheet 2 is cut in the lower plywood sheet 2 by use of the router 4. The dimensional data for cutting along the Y axis must provide a "shrinkage allowance". After completion of the cutting, an additional four veneers 31 which are coated with adhesive are placed on the lower plywood sheet 2; the four veneers 31 and the lower plywood sheet 2 are covered with the thick cloth 61 or silicone rubber sheet 6; and an upper plywood sheet 3 is manufactured on the lower plywood sheet 2. If the lower plywood sheet 2 and the upper plywood sheet 3 are heated together, the time required for solidifying the adhesive can be shortened. After the solidification, the thick cloth 61 or silicone rubber sheet 6 is removed, and the router 4 is used to cut a 4-point wide groove in the upper plywood sheet 3 for allowing the steel rule 5 to be inserted thereinto.

Figure 12:
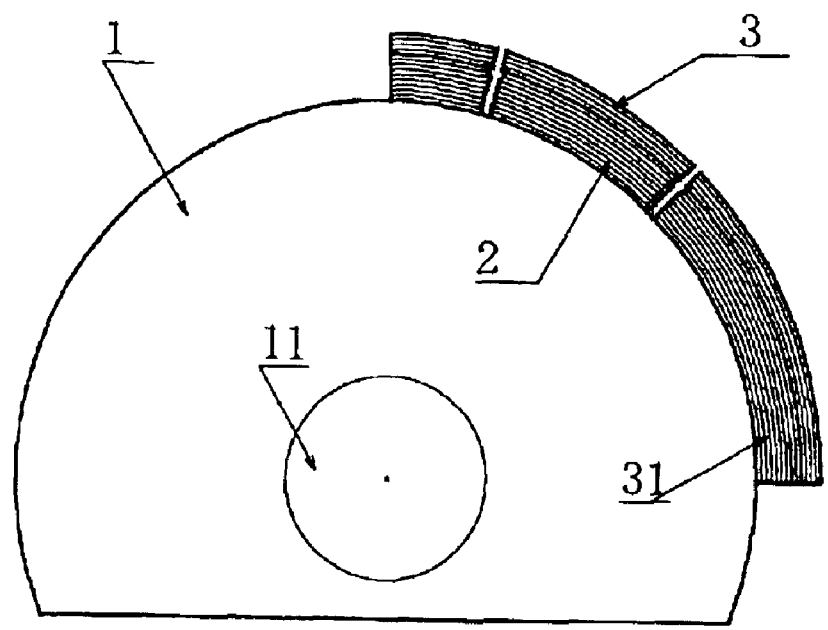
FIG. 12 is a sectional view of a rotary cutting die plywood according to an embodiment of the present invention.

The end mill to be used with this router is provided with a 4-point (1.4-mm-dia) tip portion having a length of 5 mm, and is funneled in the portion continued from the tip portion for reinforcement, like the Gerber Scientific Products, Inc. end mill as disclosed in U.S. Design Pat. No. 447,495. Therefore, the groove produced in the lower plywood sheet 2 is 4-point wide in the portion up to 5 mm from the bottom, and is funneled in the portion beyond 5 mm as shown in FIG. 12. If the funneled portion is required to be 4-point wide, it can be realized by increasing the number of lamination times to three. However, even if the groove in the surface of the lower plywood sheet 2 is funneled, practically no problem is caused.

The thickness of the plywood sheet, the thickness of each of the veneers 31 used, and the number of veneers 31 used are not limited to those in the present embodiment. They may be adjusted as needed.

Details of method (B)

With this method, after the lower plywood sheet 2 and the upper plywood sheet 3 are manufactured for storage, the lower plywood sheet 2 taken from the storage is cut by use of the router 4 to create a 4-point wide groove in the lower plywood sheet 2 for allowing the steel rule 5 to be inserted thereinto. Thereon, the upper plywood sheet 3 is placed for cutting a 4-point wide groove in the upper plywood sheet 3 to allow the steel rule 5 to be inserted thereinto. Before cutting the upper plywood sheet 3, it may be bonded to the lower plywood sheet 2. Or, after cutting of both, the upper plywood sheet 3 may be bonded to the lower plywood sheet 2 on the cylinder, or outside the machine, for example, on the blade bending cylinder.

Details of method (C)

In the above-stated methods (A) and (B), adhesive solidification is performed in two separate processes, but with the method (C), adhesive solidification is performed in only one process. Nine veneers 31 each having a thickness of approximately 1 mm which are coated with adhesive on the top side thereof are placed on the cylinder 1 (a ninth veneer 31 not being coated with adhesive). On the nine veneers 31, four veneers 31 each having a thickness of approximately 1 mm that are coated with adhesive on the top side thereof are placed (a fourth veneer 31 not being coated with adhesive). The four veneers 31 and the nine veneers 31 are covered with the thick cloth 61 or silicone rubber sheet 6, the hook 62 at both ends of the thick cloth 61 or silicone rubber sheet 6 is engaged with the hook 62 on the roller 63, and the roller(s) 63 is turned. The inside diameter of the thick cloth 61 or silicone rubber sheet 6 is gradually decreased to hold down the veneers 31 onto the circumference of the cylinder 1 and finally completely wrap the veneers 31 around the outside surface of the cylinder 1 such that the veneers 31 are in tight contact with the cylinder 1. The silicone rubber sheet 6 is sucked. Because the lower plywood sheet 2 and the upper plywood sheet 3 are heated together, the time required for solidifying the adhesive is shortened.

After the solidification, the thick cloth 61 or silicone rubber sheet 6 is removed, and the router 4 is used to cut a 4-point wide groove in the upper plywood sheet 3, in which four veneers 31 are laminated, for allowing the steel rule 5 to be inserted thereinto. After the cutting, the upper plywood sheet 3, in which four veneers 31 are laminated, is removed, and the router 4 is used to cut a 4-point wide groove in the lower plywood sheet 2 for allowing the steel rule 5 to be inserted thereinto. Bonding the lower plywood sheet 2 to the upper plywood sheet 3 may be performed outside the machine rather than on the cylinder 1.

The embodiments 9 and 10 have been explained on the assumption that only a single row of high-frequency heating devices is installed in parallel with the cylinder 1, but the present invention is not limited to this. The high-frequency heating device may be disposed in two or three rows along and above the outside surface of the cylinder 1, or in the shape of a dome along and above or mosaically above the entire outside surface of the cylinder 1. However, it is difficult to control the heat resulting from the irradiation of the high-frequency wave, and if a thermal sensor were not used to control the output of the high-frequency heating device, the heating would be non-uniform. Then, the present invention allows the Y-axis turn for cutting to also be utilized for manufacturing the plywood to prevent the heating from being non-uniform.

As means for heating the adhesive for promotion of the solidification, a high-frequency wave is optimum, but the heating means is not limited to this. A far-infrared ray band heater may be disposed above the cylinder 1, which is turned to assure uniform heating.

The present invention is configured as stated above, thus providing the following effects:

A. A rotary cutting die can be manufactured with a router, eliminating the need for using a costly laser device. It has been made possible to cut a 4-point wide groove in a 13-mm curved surface plywood by use of a router.

B. Both manufacturing and cutting of a plywood sheet on the same cylinder 1 in a single device have been made possible, so that accurate dimension cutting can be performed. Conventionally, a commercially available 13-mm curved surface plywood sheet has been purchased, and mounted on a rotary laser cutting machine with the use of bolts, thus a plywood sheet having an accurate diameter could not have been obtained in some cases. Commercially available curved surface plywoods may be deformed during transportation. Because a rotary cutting die can be manufactured from veneers 31, the cost of the plywood can be reduced. The transportation cost for the conventional commercially available curved surface plywood has been high, compared to that of the flat plate plywood.

C. It has been made possible to use the removable internal 22 in the lower plywood 2 for bending the blade such that the bottom thereof positively contacts the cylinder, and thus to obtain an accurately bent blade. This invention is especially effective for blade bending with a rotary cutting die to be used in hard anvil cutting.

D. When curved surface plywoods having a variety of diameters are required as in Japan, a curved surface plywood with a desired diameter can be manufactured and cut by manufacturing a dummy curved surface plywood on the cylinder with a small diameter by using the method in the embodiment 3.

E. A rotary cutting die can be manufactured with a router, eliminating the need for using a costly laser device. It has been made possible to cut a 4-point wide groove in a 13-mm curved surface plywood by use of a router.

F. Both manufacturing and cutting of a plywood sheet on the same cylinder 1 in a single device have been made possible, thus accurate dimension cutting can be performed. Conventionally, a commercially available 13-mm curved surface plywood has been purchased, and mounted on a rotary laser cutting machine with the use of bolts, thus a plywood sheet having an accurate diameter could not have been obtained in some cases. Commercially available curved surface plywoods may be deformed during transportation. Because a rotary cutting die can be manufactured from veneers 31, the cost of the plywood can be reduced. The transportation cost for the conventional commercially available curved surface plywood has been high, compared to that of the flat plate plywood.

G When curved surface plywoods having a variety of diameters are required as in Japan, a curved surface plywood sheet with a desired diameter can be manufactured and cut by manufacturing a dummy curved surface plywood on the cylinder with a small diameter by using the method in the embodiment 3.

H. A rotary cutting die can be manufactured with a router, eliminating the need for using a costly laser device. It has been made possible to cut a 4-point wide groove in a 13-mm curved surface plywood by use of a router.

I. Both manufacturing and cutting of a plywood on the same cylinder 1 in a single device have been made possible, thus accurate dimension cutting can be performed. Conventionally, a commercially available 13-mm curved surface plywood has been purchased, and mounted on a rotary laser cutting machine with the use of bolts, so that a plywood having an accurate diameter could not have been obtained in some cases. Commercially available curved surface plywoods may be deformed during transportation from the manufacturer to the user. Because a rotary cutting die can be manufactured from veneers 31, the cost of the plywood can be reduced. The transportation cost for the conventional commercially available curved surface plywood has been high, compared to that of the flat plate plywood.

J. When curved surface plywoods having a variety of diameters are required as in Japan, a curved surface plywood with a desired diameter can be manufactured and cut by manufacturing a dummy curved surface plywood on the cylinder with a small diameter by using the method in the embodiment 10. If the surface of the large diameter cylinder is cut by using the router 4, a plywood sheet for rotary cutting die that has an accurate inside diameter, which is the most important factor for any particular rotary cutting die, can be produced.

K. When high-frequency wave is utilized for promoting the solidification of the adhesive, the cylinder 1 can be turned around the Y axis to eliminate the non-uniformity in heating.

What is claimed is:

1. A method for manufacturing a rotary cutting die, comprising:
   fixing an upper plywood sheet or a lower plywood sheet on a cylinder;
   turning the cylinder around the Y axis;
   cutting a groove in the upper plywood sheet or the lower plywood sheet using the cylinder and a router which travels along the X axis perpendicular to the cylinder and along the Z axis vertical to the cylinder; and
   bonding the upper plywood sheet and the lower plywood sheet to each other.

2. A method for manufacturing a rotary cutting die, comprising:
   placing nine veneers each having a thickness of approximately 1 mm and which are coated with adhesive on a cylinder;
   covering the nine veneers with a silicone rubber sheet;
   evacuating the air between the cylinder and the silicone rubber sheet using a vacuum pump to force the nine veneers to be wrapped around the outside surface of the cylinder;
   solidifying the adhesive;
   after the solidification of the adhesive, removing the silicone rubber sheet;
   using a router to cut a 1.4 mm wide groove in a lower plywood sheet for allowing a steel rule to be inserted thereinto;
   placing an additional four veneers which are coated with adhesive on said lower plywood sheet;
   covering the four veneers and the lower plywood sheet with the silicone rubber sheet;
   evacuating the air between the cylinder and the silicone rubber sheet using the vacuum pump to force the four veneers to be wrapped around the outside surface of the lower plywood sheet;
   solidifying the adhesive of the additional four veneers;
   after the solidification of the adhesive of the additional four veneers, removing the silicone rubber sheet; and
   using the router to cut a 1.4 mm wide groove in an upper plywood sheet for allowing the steel rule to be inserted thereinto.

3. A method for manufacturing a rotary cutting die, comprising:
   placing nine veneers each having a thickness of approximately 1 mm and which are coated with adhesive on the top side thereof on a cylinder, the ninth veneer not being coated with adhesive;
   on the nine veneers, placing four veneers each having a thickness of approximately 1 mm and which are coated with adhesive on the top side thereof, the fourth veneer not being coated with adhesive;
   covering the four veneers and the nine veneers with a silicone rubber sheet;
   evacuating the air between the cylinder and the silicone rubber sheet using a vacuum pump to force the veneers to be wrapped around the outside surface of the cylinder;
   solidifying the adhesive;
   after the solidification of the adhesive, removing said silicone rubber sheet;
   removing an upper plywood sheet, in which said four veneers are laminated;
   using a router to cut a 1.4 mm wide groove in a lower plywood sheet of said nine veneers for allowing a steel rule to be inserted thereinto;
   replacing said upper plywood sheet, in which four veneers are laminated, and which has been temporarily removed from the cylinder, on said lower plywood sheet; and
   using the router to cut a 1.4 mm wide groove in the upper plywood sheet for allowing the steel rule to be inserted thereinto.

* * * * *